Patented May 31, 1932

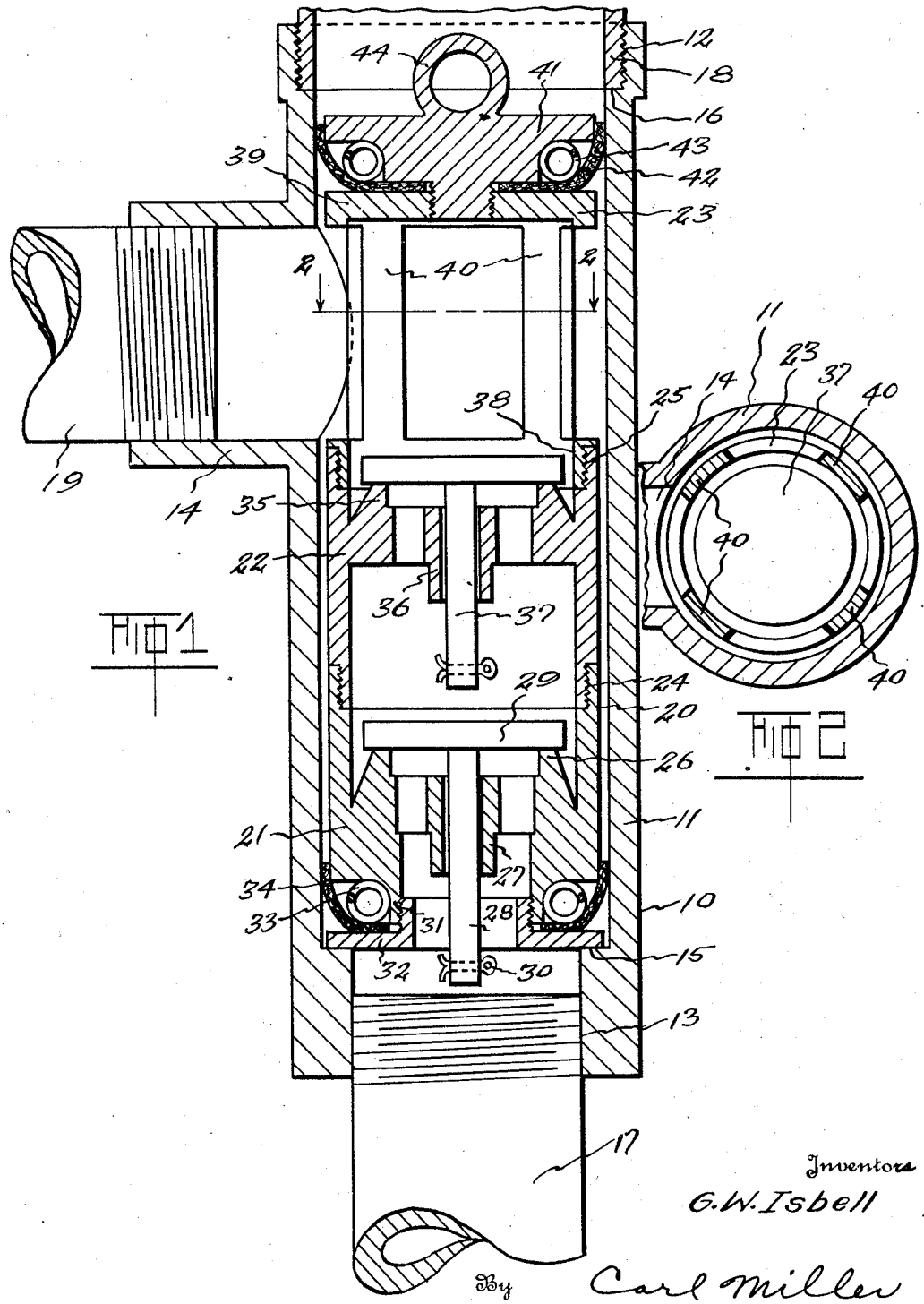

1,861,396

UNITED STATES PATENT OFFICE

GEORGE W. ISBELL, OF BALTIMORE, MARYLAND

EXTRACTING CHECK VALVE MECHANISM

Application filed December 16, 1929. Serial No. 414,536.

This invention relates to valve mechanism for underground fluid storage tanks as for example, gasoline or oil tanks.

The object of this invention is to provide a valve in the outlet pipe adjacent tank, which may be readily removable therefrom for service or repairs and which embodies in its construction a plurality of check valves, which reduce the chances of the valve proper not functioning to a minimum.

Other objects of this invention will become apparent as the description thereof given hereunder proceeds, reference being now had to the accompanying drawings wherein:—

Figure 1 is an elevational sectional view of the valve proper, and

Figure 2 is a cross-section thereof, taken on line 2—2, of Figure 1.

The valve proper denoted generally by the reference numeral 10 comprises a cylindrical housing 11, provided at its top with a threaded opening 12, and at its bottom with a threaded opening 13. Adjacent the top of the cylindrical housing 11 is a threaded cylindrical extension 14, the axis of which is at right angles to the axis of the housing 11. The bottom opening 13 of the housing 11 is of a reduced diameter and has formed adjacent its end a shoulder 15, while the upper opening 12 is of an increased diameter to form a shoulder 16. Threaded in the opening 13 is a pipe 17 which is connected at its other end to an underground storage tank (not shown). A pipe 18 is threaded in the top opening 12 of the housing 11 and terminates at the surface of the ground, for a purpose to be hereinafter described. Threaded in the extension 14 is an outlet pipe 19 which communicates with a fluid pump or discharge mechanism (not shown).

Positioned within the valve housing 11 is the valve mechanism 20, which comprises a lower valve section 21, an intermediate valve section 22, and an upper cage member 23, all of which are substantially of the same external diameter and in threaded engagement with each other at their respective abutting ends 24 and 25.

The lower valve section is formed interiorly with a valve seat 26 and a valve guide 27 in which is slidably mounted the stem 28 of a check valve 29. A cotter pin 30 is fitted in the bottom of the valve stem 28 to prevent or limit the upward movement of said valve. Integral with the bottom of the valve section 21 is an extension 31 to which is threadedly secured a flanged member 32 to retain therebetween the flexible cup washer 34. A coil spring 33 is positioned in said washer to press the same against the wall of the housing 11 to insure a fluid tight engagement. It will be noted that the bottom of the flange 32 is seated on the shoulder 15.

The intermediate valve section 22, is provided with a valve seat 35, and valve guide 36 in which is slidably mounted a check valve 37, all of which is substantially identical with the check valve structure shown in the lower valve section 21. The two valve sections 21 and 22 are of such a length that the top of the section 22 is substantially flush with the bottom of the extension 14.

Secured to the top of the intermediate valve section 22 is a cage 23, having on open bottom 38 and a solid top 39. Connecting the top and bottom of the cage are four spaced prongs 40.

Attached to the center of the top of the cage 23 is an eye member 41, which holds in locked engagement a cup washer 42 and coil spring 43, similar to that used at the bottom of the valve mechanism 20.

As the fluid is pumped from the storage tank (not shown) up through the pipe 17, the check valves 29 and 37 will be successively raised to allow the fluid to flow upwardly through the valve mechanism 20 out through the cage 23, into the outlet pipe 19, the cup washer 42 preventing any of the fluid from entering the pipe 18. In case any one of the valves sticks or does not seat properly when the pump stops operating or for any other cause, the other will return to its normal or seated position to prevent any excess fluid from escaping.

If for any reason it is desired to remove the valve mechanism 20 from the housing 11, a hooked rod (not shown) may be inserted down the pipe 18 to engage the eye 44 on the eye member 41, whereby the valve mechanism may be pulled out, through said pipe 18.

While a preferred embodiment of valve mechanism has been shown, the same is susceptible of various changes within the scope of the appended claims.

Having thus described my invention, what I claim as new and desire to secure by Letters Patent is:—

1. A valve for underground storage tanks comprising a cylindrical housing open at the top and bottom, a cylindrical extension adjacent the top of said housing integral therewith and substantially at right angles thereto, a pipe connected to each of said openings in said housing, a valve mechanism within said housing, a plurality of check valves in series in said valve mechanism, and means whereby said valve mechanism may be readily removed from said housing, said means including an upward projection on the valve mechanism.

2. A valve for underground storage tanks comprising a cylindrical housing open at the top and bottom, a cylindrical extension adjacent the top of said housing integral therewith and substantially at right angles thereto, a pipe connected to each of said openings in said housing, a valve mechanism within said housing, a plurality of check valves in series in said valve mechanism, means whereby said valve mechanism may be readily removed from said housing, said valve mechanism comprising a lower valve section, an intermediate valve section, and an upper cage, positioned end to end and removably attached to each other, said means for removing the valve mechanism including a projection thereabove.

3. A valve for underground storage tanks comprising a cylindrical housing open at the top and bottom, a cylindrical extension adjacent the top of said housing integral therewith and substantially at right angles thereto, a pipe connected to each of said openings in said housing, a valve mechanism within said housing, a plurality of check valves in series in said valve mechanism, means whereby said valve mechanism may be readily removed from said housing, said valve mechanism comprising a lower valve section, an intermediate valve section, an upper cage, positioned end to end and removably attached to each other, a valve seat and a valve guide in each of said valve sections, said check valves being slidably positioned in said valve guides and adapted to engage said valve seats, and being directly above each other.

4. A valve for underground storage tanks comprising a cylindrical housing open at the top and bottom, a cylindrical extension adjacent the top of said housing integral therewith and substantially at right angles thereto, a pipe connected to each of said openings in said housing, a valve mechanism within said housing, a plurality of check valves in series in said valve mechanism, means whereby said valve mechanism may be readily removed from said housing, said valve mechanism comprising a lower valve section, an intermediate valve section, an upper cage, positioned end to end and removably attached to each other, a valve seat and a valve guide in each of said valve sections, said check valves being slidably positioned in said valve guides and adapted to engage said valve seats, and being directly above each other, said cage having a solid top, and a plurality of spaced prongs connecting said top to the bottom edge of said cage, said cage being positioned in said housing directly opposite the cylindrical extension.

5. A valve for underground storage tanks comprising a cylindrical housing open at the top and bottom, a cylindrical extension adjacent the top of said housing integral therewith and substantially at right angles thereto, a pipe connected to each of said openings in said housing, a valve mechanism within said housing, a plurality of check valves in series in said valve mechanism, means whereby said valve mechanism may be readily removed from said housing, said valve mechanism comprising a lower valve section, an intermediate valve section, an upper cage, positioned end to end and removably attached to each other, a valve seat and a valve guide in each of said valve sections, said check valves being slidably positioned in said valve guides and adapted to engage said valve seats, and being directly above each other, and a resilient cup washer carried by the top and bottom of said valve mechanism to contact in fluid tight engagement the interior wall of said housing.

6. A valve for underground storage tanks comprising a cylindrical housing open at the top and bottom, a cylindrical extension adjacent the top of said housing integral therewith and substantially at right angles thereto, a pipe connected to each of said openings in said housing, a valve mechanism within said housing, a plurality of check valves in series in said valve mechanism, means whereby said valve mechanism may be readily removed from said housing, said valve mechanism comprising a lower valve section, an intermediate valve section, an upper cage, positioned end to end and removably attached to each other, a valve seat and a valve guide in each of said valve sections, said check valves being slidably positioned in said guides and adapted to engage said valve seats, and being directly above each other, said means for removing the valve mechanism comprising an eye member attached to the solid top of the cage.

In testimony whereof I affix my signature.

GEORGE W. ISBELL.